United States Patent
Zhao et al.

(10) Patent No.: US 8,598,820 B2
(45) Date of Patent: Dec. 3, 2013

(54) SURGE CURRENT PROTECTION CIRCUIT AND MOTOR USING THE SAME

(75) Inventors: Yong Zhao, Zhongshan (CN); Junqiang Zhang, Zhongshan (CN); Dawei Liu, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 824 days.

(21) Appl. No.: 12/581,183

(22) Filed: Oct. 19, 2009

(65) Prior Publication Data

US 2010/0208395 A1    Aug. 19, 2010

(30) Foreign Application Priority Data

Feb. 13, 2009 (CN) .................... 2009 2 0051369 U

(51) Int. Cl.
    *H02H 7/08* (2006.01)
(52) U.S. Cl.
    USPC ............. 318/400.21; 318/400.3; 318/400.22; 318/640
(58) Field of Classification Search
    USPC ........... 318/640, 400.3, 700, 400.21, 400.22, 318/782, 786, 244, 245; 361/1, 8, 13, 22, 361/23, 100, 101; 363/52, 56.12, 57, 84, 363/85, 125
    See application file for complete search history.

(56) References Cited

U.S. PATENT DOCUMENTS

| | | | | | |
|---|---|---|---|---|---|
| 3,742,337 | A | * | 6/1973 | Digneffe | 323/300 |
| 3,875,485 | A | * | 4/1975 | Hornung | 318/246 |
| 4,090,107 | A | * | 5/1978 | Seib | 315/156 |
| 4,093,899 | A | * | 6/1978 | Denny | 318/806 |
| 4,287,464 | A | * | 9/1981 | Lee et al. | 318/805 |
| 4,369,403 | A | * | 1/1983 | Lee | 318/729 |
| 4,422,030 | A | * | 12/1983 | McAllise | 318/779 |
| 4,533,857 | A | * | 8/1985 | Chang et al. | 318/729 |
| 4,658,195 | A | * | 4/1987 | Min | 318/786 |
| 6,018,473 | A | * | 1/2000 | Claassen | 363/128 |
| 6,621,668 | B1 | * | 9/2003 | Sare | 361/13 |

FOREIGN PATENT DOCUMENTS

CN    101123414 A  *  2/2008

* cited by examiner

*Primary Examiner* — Bentsu Ro
*Assistant Examiner* — Thai Dinh
(74) *Attorney, Agent, or Firm* — Matthias Scholl P.C.; Matthias Scholl

(57) ABSTRACT

A surge current protection circuit, has a control unit having an output end, a photoelectric coupling and driving circuit, a silicon symmetrical switch having a control end, and a current-limiting resistor. The current-limiting resistor and the silicon symmetrical switch are parallel connected altogether and then serially connected to a load and an AC input, and the control end of the silicon symmetrical switch is connected to the output end of the control unit via the photoelectric coupling and driving circuit. The invention features low production cost, high reliability and improved power efficiency, and is capable of effectively suppressing surge current.

4 Claims, 5 Drawing Sheets

SURGE CURRENT PROTECTION CIRCUIT AND MOTOR USING THE SAME

CROSS-REFERENCE TO RELATED APPLICATIONS

Pursuant to 35 U.S.C. §119 and the Paris Convention Treaty, this application claims the benefit of Chinese Patent Application No. 200920051369.X filed on Feb. 13, 2009, the contents of which are incorporated herein by reference.

BACKGROUND OF THE INVENTION

1. Field of the Invention

The invention relates to a surge current protection circuit and motors using the same.

2. Description of the Related Art

Surge current protection circuits are widely used in power supplies of electronic devices such as motors, so as to prevent current higher than a rated value from damaging the electronic devices and power systems. As shown in FIG. 1, a conventional surge current protection circuit employs a negative temperature coefficient (NTC) thermistor. However, there are several problems with the NTC thermistor: since it continuously operates, it generates large calorific power and high temperature and consumes a lot of electricity, which reduces reliability of the electronic device.

Another typical surge current protection circuit is implemented by a mechanical relay contact parallel connected to a resistor. But the mechanical relay contact has short lifetime, which reduces reliability of the electronic device and increases production cost thereof.

SUMMARY OF THE INVENTION

In view of the above-described problem, it is one objective of the invention to provide a surge current protection circuit that features low production cost, high reliability and improved power efficiency.

It is another objective of the invention to provide an AC motor with a surge current protection circuit that features low production cost, high reliability and improved power efficiency.

It is a further objective of the invention to provide a DC motor with a surge current protection circuit that features low production cost, high reliability and improved power efficiency.

To achieve the above objectives, in accordance with one embodiment of the invention, provided is a surge current protection circuit, comprising a control unit having an output end, a photoelectric coupling and driving circuit, a silicon symmetrical switch having a control end, and a current-limiting resistor. The current-limiting resistor and the silicon symmetrical switch are parallel connected altogether and then serially connected to a load and an AC input, and the control end of the silicon symmetrical switch is connected to the output end of the control unit via the photoelectric coupling and driving circuit.

In a class of this embodiment, the control unit is a micro controller unit or a timer.

In a class of this embodiment, the photoelectric coupling and driving circuit comprises a signal input circuit, a photoelectric coupler and a surge absorption circuit.

In accordance with another embodiment of the invention, provided is an AC motor, comprising a rotor, a stator, a coil winding, and a surge current protection circuit, comprising a control unit having an output end, a photoelectric coupling and driving circuit, a silicon symmetrical switch having a control end, and a current-limiting resistor, wherein the current-limiting resistor and the silicon symmetrical switch are parallel connected altogether and then serially connected to an AC input, and the control end of the silicon symmetrical switch is connected to the output end of the control unit via the photoelectric coupling and driving circuit.

In a class of this embodiment, the control unit is a micro controller unit or a timer.

In a class of this embodiment, the photoelectric coupling and driving circuit comprises a signal input circuit, a photoelectric coupler and a surge absorption circuit.

In a class of this embodiment, the coil winding is wrapped on the stator.

In accordance with a further embodiment of the invention, provided is a DC motor, comprising a rotor, a stator, a coil winding, a motor controller having an output end, and a power supply, comprising a rectifying circuit having an output end, and a surge current protection circuit, comprising a photoelectric coupling and driving circuit, a silicon symmetrical switch having a control end, and a current-limiting resistor. The motor controller is connected to an AC input via the surge current protection circuit and the rectifying circuit, the current-limiting resistor and the silicon symmetrical switch are parallel connected altogether and then serially connected to the output end of the rectifying circuit, and the output end of the motor controller is connected to the control end of the silicon symmetrical switch via the photoelectric coupling and driving circuit.

In a class of this embodiment, the motor controller is a micro controller unit.

In a class of this embodiment, the photoelectric coupling and driving circuit comprises a signal input circuit, a photoelectric coupler and a surge absorption circuit.

In a class of this embodiment, the coil winding is wrapped on the stator.

Advantages of the invention comprise: 1) the silicon symmetrical switch is capable of preventing the current-limiting resistor from continuously operating, and thus saving power; 2) the silicon symmetrical switch has no relay contact, and thus lifetime of the surge current protection circuit is increased, reliability thereof is improved, and production cost thereof is reduced; 3) the surge current protection circuit is small, and a strong current portion and a weak current portion are separated from each other, which improves safety and reliability of the surge current protection circuit, and enables the surge current protection circuit to effectively suppresses surge current; 4) the coil winding and the motor controller greatly improve safety and reliability of the motor.

BRIEF DESCRIPTION OF THE DRAWINGS

The invention is described hereinafter with reference to accompanying drawings, in which.

DETAILED DESCRIPTION OF THE EMBODIMENTS

Figure 1:
FIG. 1 is a surge current protection circuit in the prior art.
Figure 2:
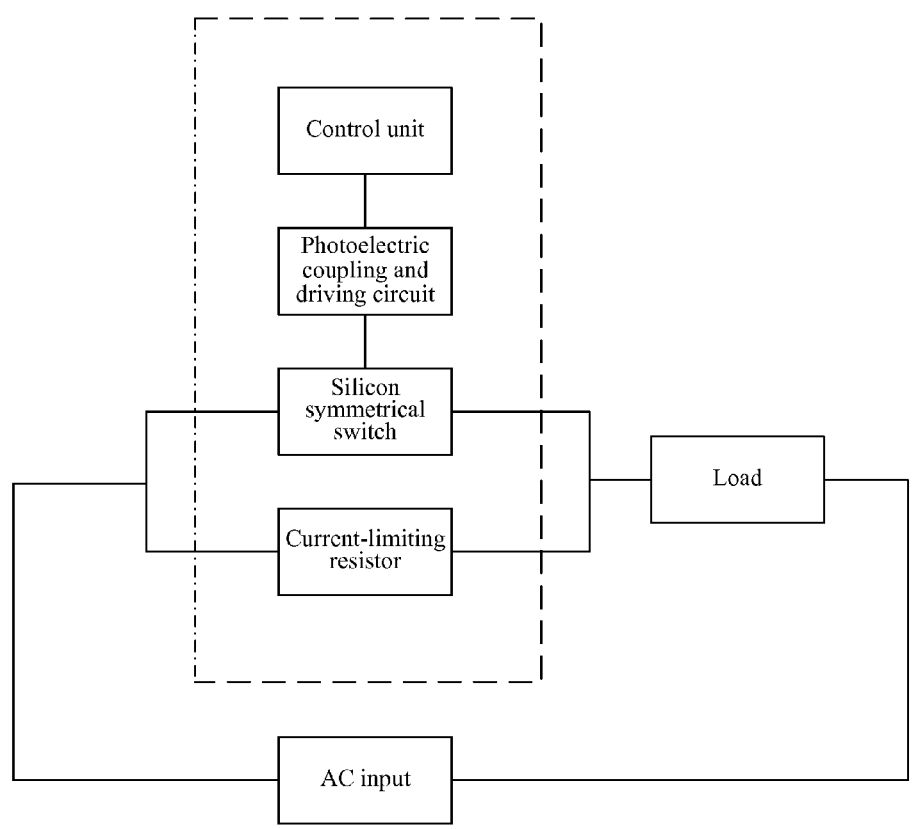
FIG. 2 is a block diagram of a surge current protection circuit of an exemplary embodiment of the invention.

As shown in FIG. 2, a surge current protection circuit of the invention comprises a control unit having an output end, a photoelectric coupling and driving circuit, a silicon symmetrical switch having a control end, and a current-limiting resistor.

The current-limiting resistor and the silicon symmetrical switch are parallel connected altogether and then serially connected to a load and an AC input, and the control end of the silicon symmetrical switch is connected to the output end of the control unit via the photoelectric coupling and driving circuit.

In this embodiment, the control unit is a micro controller unit (MCU) or a timer.

Figure 3:
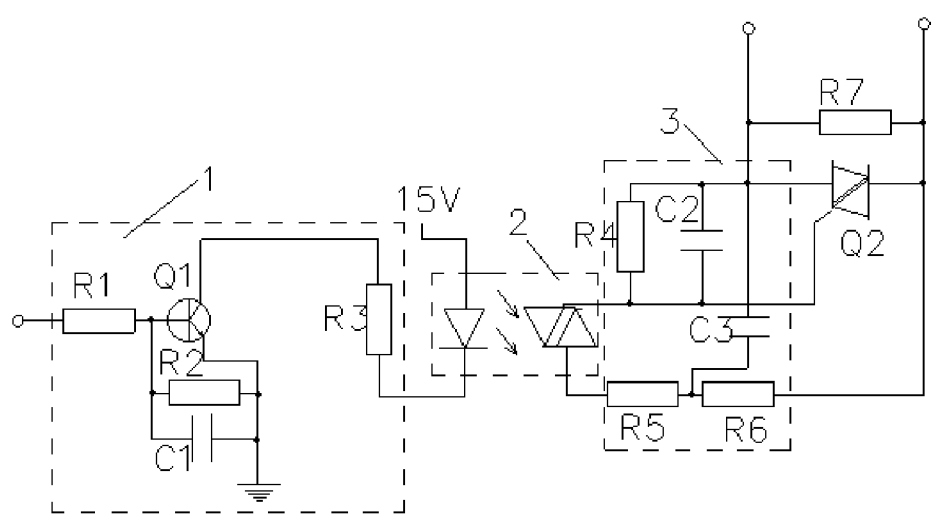
FIG. 3 is a schematic diagram of a surge current protection circuit of an exemplary embodiment of the invention.

As shown in FIG. 3, a surge current protection circuit of the invention comprises a signal input circuit 1, a photoelectric coupler 2, a surge absorption circuit 3, a silicon symmetrical switch Q2, and a current-limiting resistor R7. The signal input circuit 1, the photoelectric coupler 2 and the surge absorption circuit 3 form a photoelectric coupling and driving circuit.

The signal input circuit 1 comprises multiple resistors R1, R2 and R3, a triode Q1, and a capacitor C1.

The surge absorption circuit 3 comprises multiple resistors R4, R5 and R6, and multiple capacitors C2 and C3.

An input end of the signal input circuit 1 is connected to the output end of the control unit.

The control end of the silicon symmetrical switch Q2 is connected to the output end of the control unit via the photoelectric coupling and driving circuit.

The surge current protection circuit is connected to the AC input. As current from the AC input is too big and surge current is generated and passes the surge current protection circuit. The control unit of the surge current protection circuit transmits a control signal to the signal input circuit 1 of the photoelectric coupling and driving circuit. After being processed by the photoelectric coupler 2, the control signal is transmitted to the surge absorption circuit 3 and controls the silicon symmetrical switch Q2 to open. At this time the current-limiting resistor R7 limits current and the surge absorption circuit 3 absorbs surge generated in the circuit. After the AC input is stabilized, the control unit of the surge current protection circuit transmits another control signal via the photoelectric coupling and driving circuit, and the control signal controls the silicon symmetrical switch Q2 to close. At this time, the current-limiting resistor R7 is shortened, which reduces energy loss, saves power and improves reliability of the surge current protection circuit.

Figure 4:
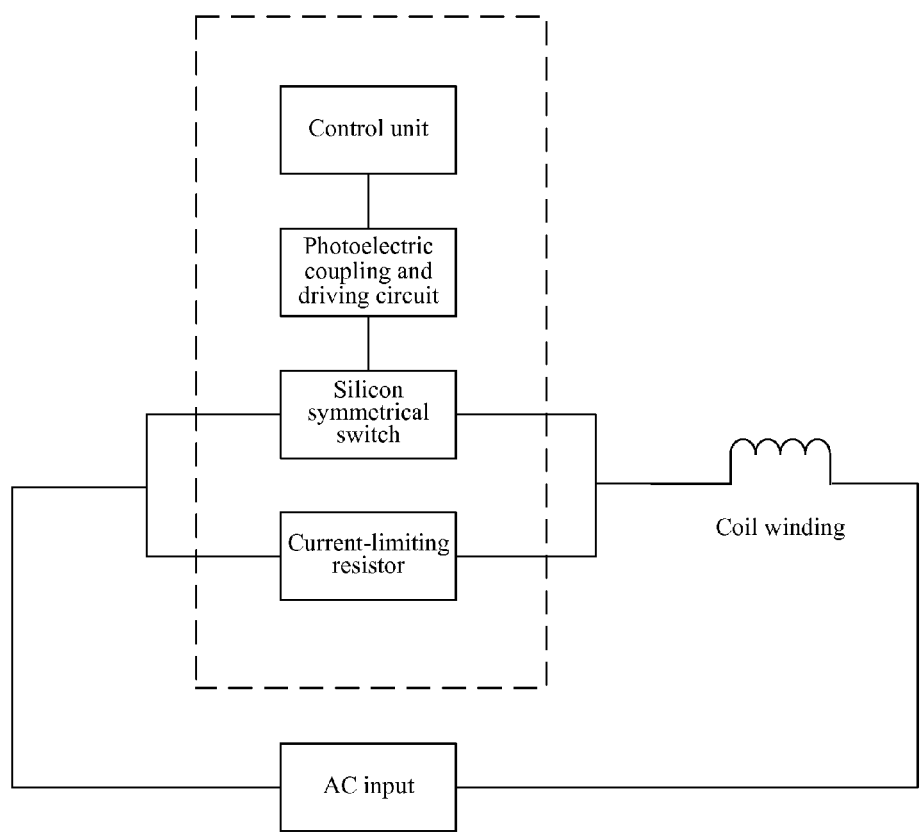
FIG. 4 is a block diagram of an AC motor with a surge current protection circuit of an exemplary embodiment of the invention.

As shown in FIG. 4, an AC motor of the invention comprises a rotor, a stator, a coil winding, and a surge current protection circuit.

The coil winding is wrapped on the stator.

The surge current protection circuit comprises a control unit having an output end, a photoelectric coupling and driving circuit, a silicon symmetrical switch having a control end, and a current-limiting resistor.

The current-limiting resistor and the silicon symmetrical switch are parallel connected altogether and then serially connected to an AC input, and the control end of the silicon symmetrical switch is connected to the output end of the control unit via the photoelectric coupling and driving circuit.

In this embodiment, the control unit is a micro controller unit (MCU) or a timer.

The photoelectric coupling and driving circuit comprises a signal input circuit, a photoelectric coupler and a surge absorption circuit.

Figure 5:
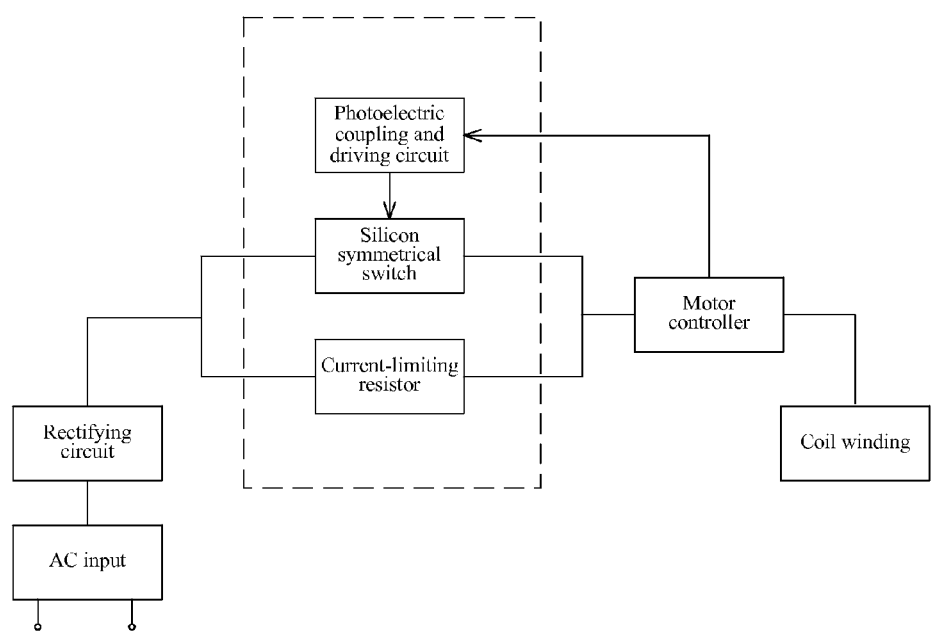
FIG. 5 is a block diagram of a DC motor with a surge current protection circuit of an exemplary embodiment of the invention.

As shown in FIG. 5, a DC motor of the invention comprises a rotor, a stator, a coil winding, a motor controller having an output end, and a power supply.

The coil winding is wrapped on the stator.

The power supply comprises a rectifying circuit having an output end, and a surge current protection circuit.

The surge current protection circuit comprises a photoelectric coupling and driving circuit, a silicon symmetrical switch having a control end, and a current-limiting resistor.

The motor controller is connected to an AC input via the surge current protection circuit and the rectifying circuit, the current-limiting resistor and the silicon symmetrical switch are parallel connected altogether and then serially connected to the output end of the rectifying circuit, and the output end of the motor controller is connected to the control end of the silicon symmetrical switch via the photoelectric coupling and driving circuit.

In this embodiment, the motor controller is a micro controller unit (MCU).

The photoelectric coupling and driving circuit comprises a signal input circuit, a photoelectric coupler and a surge absorption circuit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A DC motor, comprising
a rotor;
a stator;
a coil winding;
a motor controller having an output end; and
a power supply, comprising
   a rectifying circuit having an output end; and
   a surge current protection circuit, comprising
     a photoelectric coupling and driving circuit;
     a silicon symmetrical switch having a control end; and
     a current-limiting resistor;
wherein
  said motor controller is connected to an AC input via said surge current protection circuit and said rectifying circuit;
  said motor controller switches off said silicon symmetrical switch when current from said AC input is greater than a rated value, and said motor controller switches on said silicon symmetrical switch when current from said AC input is not greater than said rated value;
  said current-limiting resistor and said silicon symmetrical switch are parallel connected altogether and then serially connected to said output end of said rectifying circuit; and
  said output end of said motor controller is connected to said control end of said silicon symmetrical switch via said photoelectric coupling and driving circuit.

2. A DC motor of claim 1, wherein said motor controller is a micro controller unit.

3. A DC motor of claim 1, wherein said photoelectric coupling and driving circuit comprises a signal input circuit, a photoelectric coupler and a surge absorption circuit.

4. A DC motor of claim 1, wherein said coil winding is wrapped on said stator.

* * * * *